US011870836B2

(12) United States Patent
Lepeska et al.

(10) Patent No.: US 11,870,836 B2
(45) Date of Patent: Jan. 9, 2024

(54) ACCELERATING CONNECTIONS TO A HOST SERVER

(71) Applicant: VIASAT, INC., Carlsbad, CA (US)

(72) Inventors: Peter J Lepeska, Boston, MA (US); Demetrios J Tsillas, Littleton, MA (US)

(73) Assignee: VIASAT, INC., Carlsbad, CA (US)

( * ) Notice: Subject to any disclaimer, the term of this patent is extended or adjusted under 35 U.S.C. 154(b) by 862 days.

(21) Appl. No.: 15/777,478

(22) PCT Filed: Dec. 2, 2016

(86) PCT No.: PCT/US2016/064778
§ 371 (c)(1),
(2) Date: May 18, 2018

(87) PCT Pub. No.: WO2017/096269
PCT Pub. Date: Jun. 8, 2017

(65) Prior Publication Data
US 2018/0367645 A1    Dec. 20, 2018

Related U.S. Application Data

(60) Provisional application No. 62/263,241, filed on Dec. 4, 2015.

(51) Int. Cl.
*H04L 67/01*    (2022.01)
*H04L 67/5681*    (2022.01)
*H04L 67/1097*    (2022.01)

(52) U.S. Cl.
CPC .......... *H04L 67/01* (2022.05); *H04L 67/1097* (2013.01); *H04L 67/5681* (2022.05)

(58) Field of Classification Search
CPC ............... H04L 67/1097; H04L 67/141; H04L 67/2847; H04L 67/42
See application file for complete search history.

(56) References Cited

U.S. PATENT DOCUMENTS

| 5,485,609 A | 1/1996 | Vitter et al. |
| 6,055,569 A | 4/2000 | O'Brien et al. |

(Continued)

FOREIGN PATENT DOCUMENTS

| EP | 1 041 497 | 1/2005 |
| WO | WO-2017/096269 A1 | 6/2017 |

OTHER PUBLICATIONS

"The First Few Milliseconds of an HTTPS Connection", Jun. 10, 2009, 18 pgs.

(Continued)

*Primary Examiner* — Joe Chacko
(74) *Attorney, Agent, or Firm* — GTC LAW GROUP PC & AFFILIATES

(57) ABSTRACT

In anticipation of a client device establishing a connection over a network with a remote host service, a pre-connect module generates a connection request (referred to herein as a "pre-connect request") on behalf of the client device and sends the pre-connect request to the remote host server. The remote server responds with a connection response (referred to herein as a "pre-connect response"), which is pre-positioned on the client-side of the network along with information for generating a later connection request that is in material respects the same as the pre-connect request. Then, when the client device later seeks to establish a connection with the remote host server, the client device determines whether it has in local storage generation information for generating a connection request to the remote host server. If so, the client device uses the generation information to generate a connection request that is in material respects the same as the pre-connect request. An interceptor on the client-side of the network intercepts connection requests and determines whether a corresponding pre-connect response is locally stored. If so, the interceptor sends the locally stored (Continued)

pre-connect response as a complete response to the intercepted request, which can be discarded.

33 Claims, 13 Drawing Sheets

(56) References Cited

U.S. PATENT DOCUMENTS

| | | | |
|---|---|---|---|
| 6,085,193 A | | 7/2000 | Malkin |
| 6,085,226 A * | | 7/2000 | Horvitz ............... G06F 16/9574 709/203 |
| 6,389,462 B1 * | | 5/2002 | Cohen ..................... H04L 29/06 707/999.01 |
| 6,622,168 B1 | | 9/2003 | Datta |
| 6,721,780 B1 | | 4/2004 | Kasriel et al. |
| 6,993,591 B1 * | | 1/2006 | Klemm ............... H04L 67/2847 707/999.002 |
| 7,113,935 B2 | | 9/2006 | Saxena |
| 7,716,332 B1 | | 5/2010 | Topfl et al. |
| 7,747,749 B1 * | | 6/2010 | Erikson ............... G06F 16/9574 709/226 |
| 7,975,025 B1 * | | 7/2011 | Szabo ................. G06F 16/9574 709/218 |
| 8,136,089 B2 | | 3/2012 | Snodgrass et al. |
| 8,224,964 B1 | | 7/2012 | Fredrickson et al. |
| 8,281,029 B2 * | | 10/2012 | Chatterjee ............ H04B 7/1858 709/235 |
| 8,335,838 B2 | | 12/2012 | Zhang et al. |
| 8,341,245 B1 | | 12/2012 | Roskind et al. |
| 8,478,843 B1 | | 7/2013 | Ortlieb et al. |
| 8,566,788 B2 | | 10/2013 | Snodgrass et al. |
| 9,083,583 B1 * | | 7/2015 | Roskind ............... H04L 29/0809 |
| 9,135,364 B1 | | 9/2015 | Sundaram et al. |
| 9,747,386 B1 | | 8/2017 | Jenkins et al. |
| 10,372,780 B1 | | 8/2019 | Lepeska et al. |
| 10,375,192 B1 * | | 8/2019 | Lepeska ................. H04L 69/14 |
| 11,176,219 B1 | | 11/2021 | Lepeska et al. |
| 11,176,223 B1 | | 11/2021 | Hill |
| 2001/0047517 A1 | | 11/2001 | Christopoulos et al. |
| 2002/0010761 A1 | | 1/2002 | Carneal et al. |
| 2004/0064577 A1 | | 4/2004 | Dahlin et al. |
| 2005/0193096 A1 | | 9/2005 | Yu et al. |
| 2006/0075068 A1 | | 4/2006 | Kasriel et al. |
| 2008/0091711 A1 | | 4/2008 | Snodgrass et al. |
| 2008/0114773 A1 | | 5/2008 | Choi |
| 2009/0112975 A1 | | 4/2009 | Beckman et al. |
| 2009/0228782 A1 | | 9/2009 | Fraser |
| 2009/0276488 A1 | | 11/2009 | Alstad |
| 2010/0146415 A1 * | | 6/2010 | Lepeska ............... H04L 67/2847 715/760 |
| 2011/0258532 A1 | | 10/2011 | Ceze et al. |
| 2011/0295979 A1 | | 12/2011 | Alstad et al. |
| 2012/0066586 A1 | | 3/2012 | Shemesh |
| 2012/0239598 A1 | | 9/2012 | Cascaval et al. |
| 2012/0324036 A1 * | | 12/2012 | Chatterjee ............ H04L 67/288 709/213 |
| 2013/0031459 A1 | | 1/2013 | Khorashadi et al. |
| 2013/0226992 A1 | | 8/2013 | Bapst et al. |
| 2013/0297561 A1 | | 11/2013 | Mizrotsky et al. |
| 2014/0237066 A1 * | | 8/2014 | Fainberg ............. G06F 12/0862 709/213 |
| 2015/0156194 A1 | | 6/2015 | Modi et al. |
| 2015/0288738 A1 | | 10/2015 | Chatterjee et al. |

OTHER PUBLICATIONS

Grigorik, "Chrome Networking: DNS Prefetch & TCP Preconnect", Jun. 4, 2012, 5 pgs.
Grigorik, "Eliminating Roundtrips with Preconnect", Aug. 17, 2015, 4 pgs.
Hartmann, "Pre-Connecting TCP and SSL Sockets for HTTP(S) Requests In Qt Apps", Sep. 29, 2013, 3 pgs.
Jackson, "Resource Hints—What is Preload, Prefetch, and Preconnect?", Jul. 1, 2016, 11 pgs.
"Preconnect", Jul. 20, 2016, 4 pgs.
W3C, Resource Hints Specification as edited by Ian Hickson, https://w3c.github.io/resource-hints/, 2017, 10 pgs.
International Search Report and Written Opinion mailed in International (PCT) Application No. PCT/US2016/064778 dated Mar. 23, 2017, 10 pgs.
International Preliminary Report on Patentability mailed in International (PCT) Application No. PCT/US2016/064778 dated Jun. 14, 2018, 8 pgs.
B. de la Ossa et al., "Delfos: the Oracle to Predict Next Web User's Accesses," 21st International Conference on Advanced Networking and Applications (AINA '07), DOI: 0-7695-2846-5/07, 2007, in 8 pages.
Extended European Search Report from the European Patent Office for Application EP 21 15 3965 (which claims priority to the present US application), dated Jun. 18, 2021, in 10 pages.
Intention to Grant by the European Patent Office for Application EP 21 15 3965 (which claims priority to the present US application), dated Feb. 23, 2023, in 44 pages.
Applicant reply to Extended European Search Report for Application EP 21 15 3965 (which claims priority to the present US application), dated Jan. 26, 2022, in 21 pages.
Grigorik, Ilya, "High Performance Networking in Google Chrome," https://www.igvita.com/posa/high-performance-networking-in-google-chrome/ , Jan. 31, 2013, 20 pages.
Souders, Steve, "Prebrowsing," https://www.stevesouders.com/blog/2013/11/07/prebrowsing/ , Nov. 7, 2013, 8 pages.
Grigorik et al., "Resource Hints," W3C Working Draft, https://www.w3.org/TR/2016/WD-resource-hints-20160225/ , Feb. 25, 2016, 13 pages.
Grigorik et al., "Resource Hints," W3C First Public Working Draft, https://wwww3.org/TR/2014/WD-resource-hints-20141021/ , Oct. 21, 2014, 10 pages.

\* cited by examiner

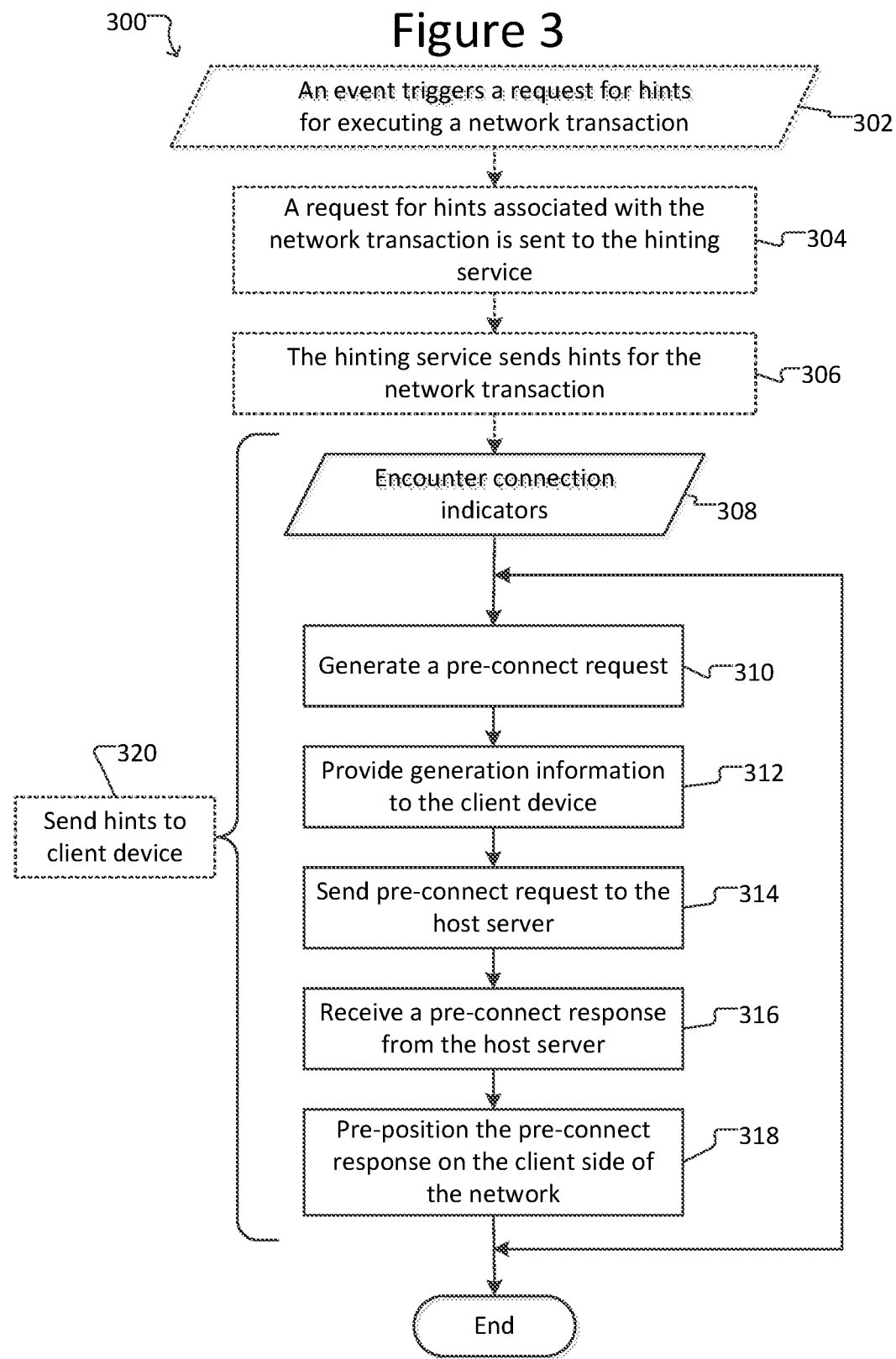

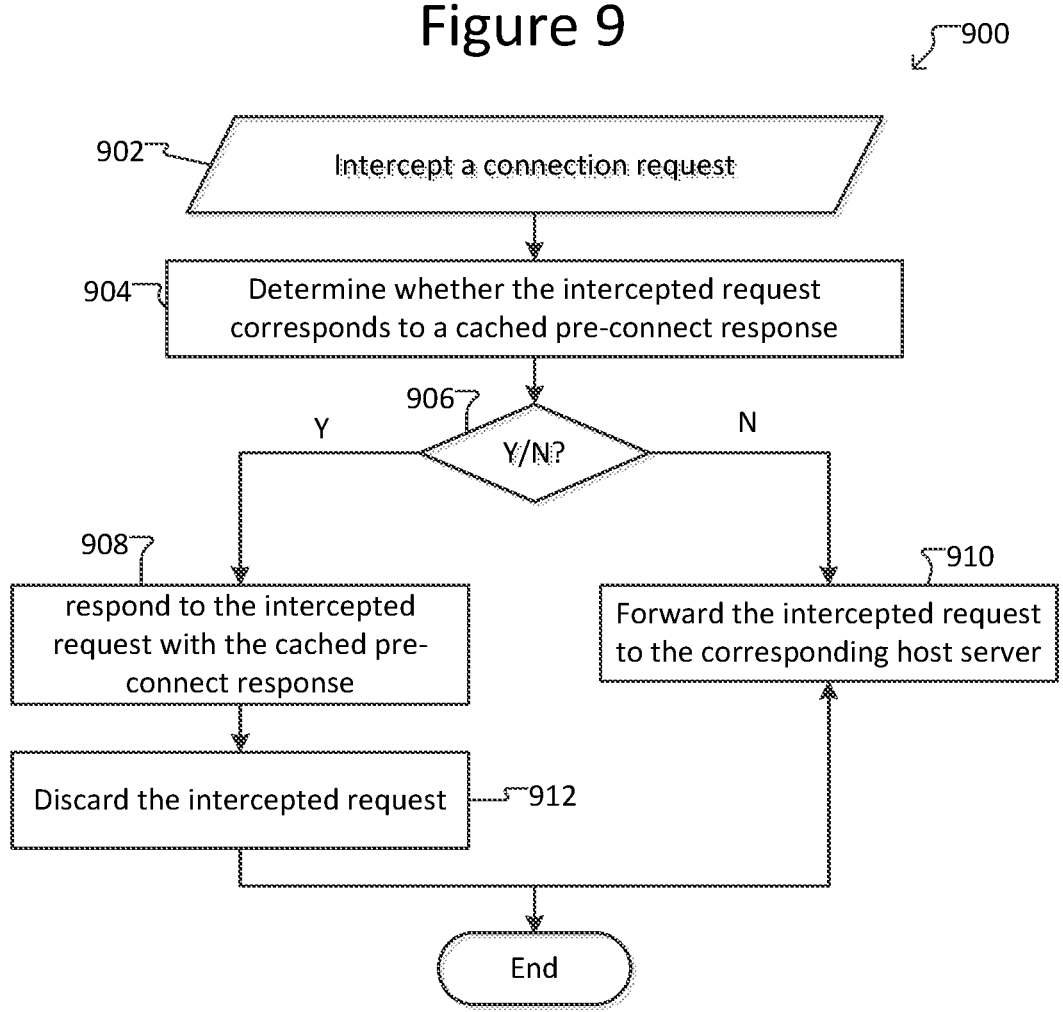

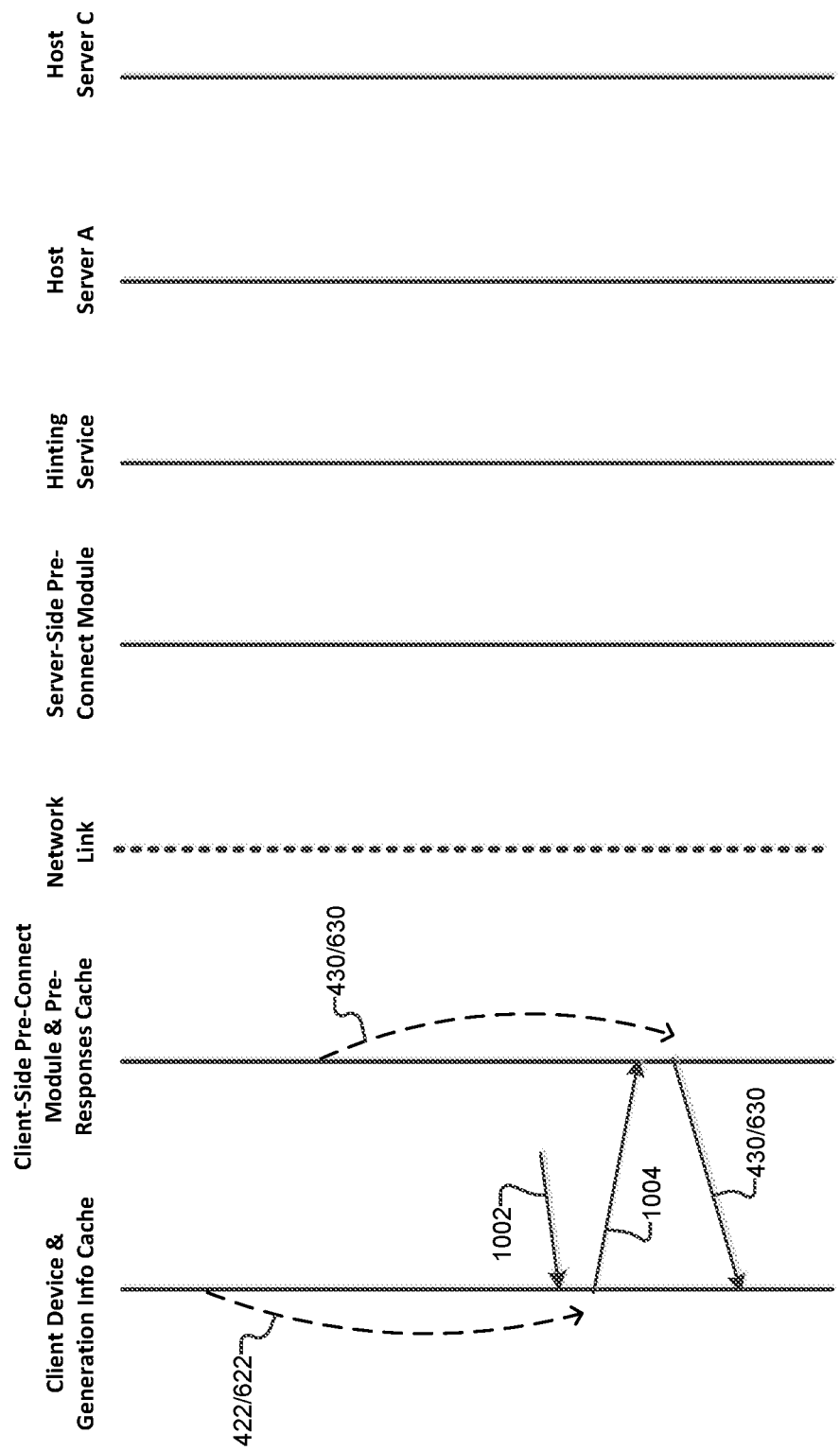

ACCELERATING CONNECTIONS TO A HOST SERVER

BACKGROUND

In modern network systems, a local device (e.g., a Web browser on a personal computer) often executes network transactions that involve fetching many resources from a variety of different sources. This can involve establishing persistent connections with and then downloading resources from many different remote host servers. Typically, establishing a persistent connection with a remote host server involves a handshake that comprises at least an initial request from the local device and a compliant response from the host server. Multiple connection requests and responses for establishing persistent connections with all of the remote host servers from which resources are fetched during a network transaction can add to other delays in completing the network transaction. The result can be an overall, cumulative delay in completing the network transaction that is greater than most users would like. Embodiments of the present invention address the foregoing problem by eliciting pre-connect responses from remote host servers to which connections are expected as a local device executes a network transaction. The pre-connect responses are then pre-positioned on the client-side of the network. Later, as the client device executes the network transaction and initiates the actual handshake connection process with a host server, the connection request generated by the client device can be intercepted and the pre-positioned response provided to the client device, thereby saving at least two trips across the network. Some embodiments of the invention provide these and/or other advantages.

BRIEF SUMMARY

In some embodiments, setup of a persistent connection over a network involving a handshake comprising at least a connection request by a client device followed by a compliant response by a remote host server is accelerated.

After it is determined that a client device may in the future seek a connection with a particular host server, a pre-connect request on behalf of the client device can be generated and sent to the host server. The pre-connect request can mimic a connection request by the client device so that the host server generates a compliant connection response. The host server's connection response (often referred to herein as a "pre-connect response") can then be prepositioned on the client-side of the network along with generation information indicating how the pre-connect request was generated.

Later, when the client device determines to initiate an actual connection handshake with the host server, the client device first checks a client-side cache for generation information for generating a connection request to the host server. If the client device finds such generation information, the client device uses the generation information to generate the connection request, which should thus be materially the same as the pre-connect request previously used to elicit the pre-connect response. If the client device does not find corresponding generation information, the client device generates the connection request in accordance with applicable protocols of the handshake process. Regardless of how the connection request was generated, the client device sends the connection request to the host server. An interceptor on the client-side of the network intercepts connection requests and checks a client-side cache for a corresponding pre-connect response. If the interceptor finds such a pre-connect response, the interceptor sends the pre-connect response to the client device. Because the pre-connect response was previously generated by the host server in response to a pre-connect request that is materially the same as the intercepted connection request, the pre-connect request should be accepted by the client device as a compliant response to the connection request, causing the client device to proceed with the handshake process to establishment of a connection with the host server. If the interceptor does not find a corresponding pre-connect response, the interceptor forwards the intercepted connection request across the network to the remote host server.

BRIEF DESCRIPTION OF THE DRAWINGS

FIG. 3 is an example of a method for eliciting pre-connect responses from host servers and pre-positioning the pre-connect responses along with information indicating how the pre-connect responses were elicited on the client-side of the network according to some embodiments of the invention.

FIG. 9 illustrates an example of a method by which the connection requests of FIG. 8 are intercepted and responded to with pre-positioned pre-connect responses, if available, from host servers according to some embodiments of the invention.

FIG. 10 illustrates examples of operation of the methods of FIGS. 8 and 9 according to some embodiments of the invention.

DETAILED DESCRIPTION OF EXEMPLARY EMBODIMENTS

Figure 1:
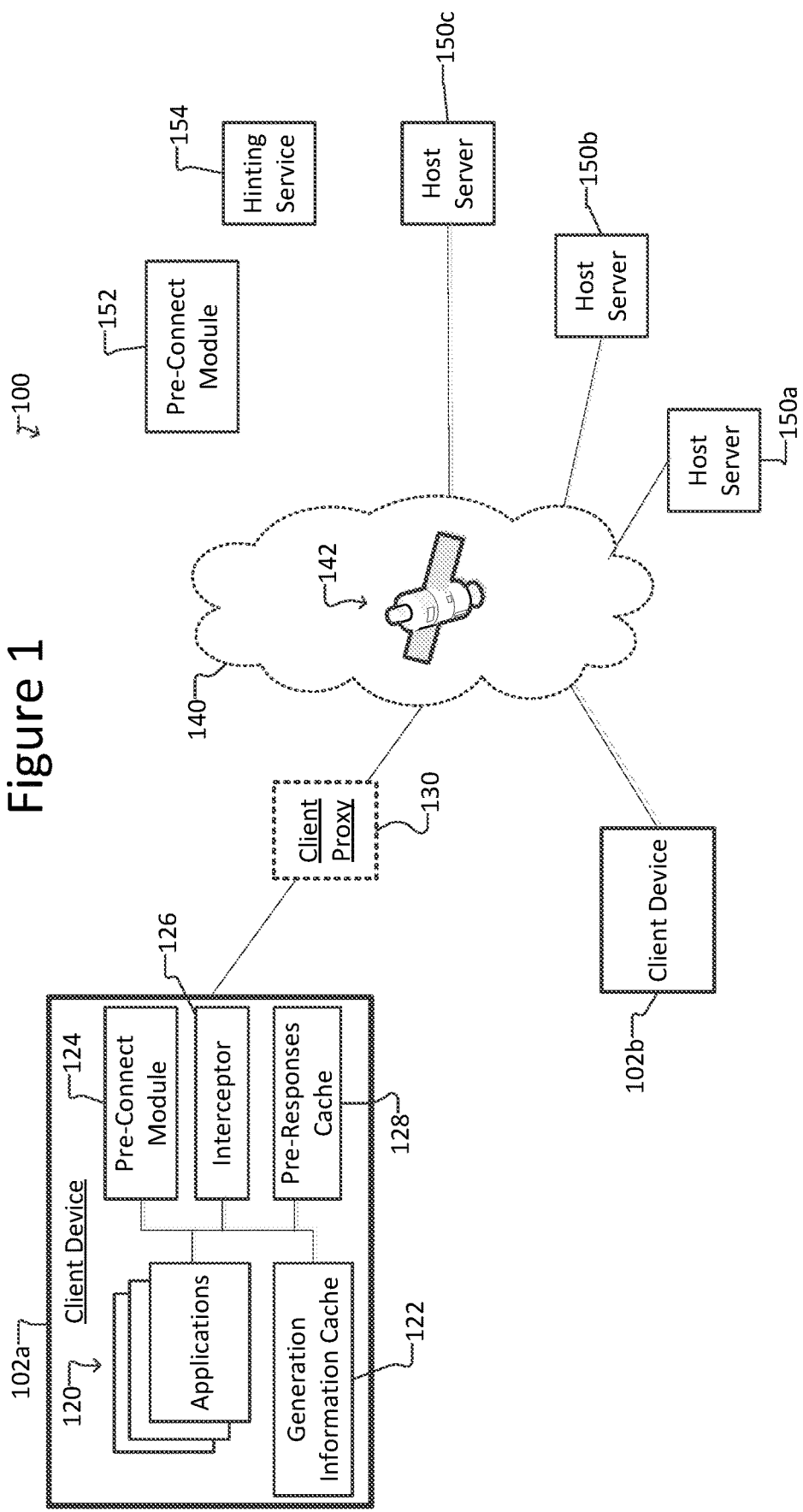
FIG. 1 illustrates an example network system in which pre-connect responses can be elicited from remote host servers and pre-positioned on the client-side of the network according to some embodiments of the invention.

This specification describes exemplary embodiments and applications of various embodiments of the invention. The invention, however, is not limited to the exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "ones" means more than one.

As used herein, a "network resource" includes a visual (e.g., text, image, video, or the like) object, an audio object, a collection of one or more instructions (e.g., a page encoded in hypertext, a style sheet such as a cascading style sheet (CSS) for displaying and/or playing a network resource, a script file such as a JavaScript file, or the like), or a network service made available and/or provided by one device on a network to other devices upon request by one of the other devices. A "network resource" is sometimes referred to simply as a "resource."

As used herein, "persistent connection" refers to a connection between devices on a network that, once established, remains until terminated by one of the devices or due to a time out after a pre-defined period of non-use. A persistent connection can thus remain in existence over multiple exchanges of data, messages, or the like between a client device and a host server. A web socket connection between two network devices is an example of a persistent connection. Known protocols for establishing a persistence connection between devices on a network include Hypertext Transfer Protocol (HTTP) and Hypertext Transfer Protocol Secure (HTTPS). Some connection protocols (e.g., HTTPS) allow a client device to establish a secure connection with a host server. Secure connection protocols include Secure Sockets Layer (SSL) and Transport Layer Security (TLS) protocols. A ClientHello message is an example of a known connection request for establishing a secure connection, and a ServerHello is an example of a corresponding connection response.

In many network systems, a client device (e.g., a personal computing device running a Web browser) establishes a persistent connection with a remote host server by a handshake protocol. Typically, the client device starts the handshake by sending a connection request over the network to the host server and then waiting for a connection response from the host server. Only if the connection response is received and complies with the handshake protocol does the client device proceed with the handshake. Once the handshake process is completed and a persistent connection established, the client device can obtain network resources, services, or the like from the host server.

In modern networks, a client device executing a network transaction often requests resources, services, and/or the like from many different host servers. In order to complete a network transaction, a client device thus often must establish connections with and then request resources, services, and/or the like from many different host servers. This can result in many transmissions of messages over the network and result in not insignificant delays in completing the network transaction. Indeed, merely establishing connections with each host server can comprise a not insignificant portion of the delay.

Some embodiments of the invention attempt to reduce this delay by accelerating the process of establishing connections with host servers. When it is known beforehand that a client device will or even might attempt in the future to establish a connection with a particular host server (e.g., as part of a network transaction), some embodiments of the invention mimic a connection request (hereinafter a "pre-connect request") to the host server, which elicits a connection response (hereinafter a "pre-connect response") from the host server. The pre-connect response is then preposition on the local-device side of the network along with information indicating how the pre-connect request was generated. Then, when the client device starts the process of establishing an actual connection with the host server, the client device can first determine whether it has locally stored information indicating how a pre-connect request to the host server was generated (hereinafter this information is referred to as "generation information"). If so, the client device uses the generation information to generate a connection request that is materially the same as the pre-connect request. If no, the client device generates a connection request in accordance with the applicable handshake protocol. An interceptor on the client-side of the network intercepts connection requests and determines, for each intercepted connection request, whether a corresponding pre-connect response is locally stored on the client-side of the network. If so, the interceptor provides the locally stored pre-connect response as a response to the intercepted connection request, which can now be discarded. If no, the interceptor forwards the connection request to the host server to which the connection request is addressed.

In those instances in which a pre-connect response from the host server to which the intercepted connection request is addressed is locally stored, providing the locally stored pre-connect response to the client device can accelerate the process of establishing the connection by at least the time corresponding to a round trip across the network. That is, at least the sum of the following is saved: the time for the actual connection request by the client device to travel across the network to the host server, the time for the host server to generate a connection response, and the time for the connection response to travel back across the network to the client device. Embodiments of the invention can provide these and other advantages, which can be particularly advantageous when the network between the client device and the host server has a relatively high latency such as when the network includes one or more satellite links The invention, however, is not limited to use over a network that includes a satellite link or any high latency link FIG. 1 shows a high level, block diagram depiction of an example of a system 100 according to some embodiments of the invention. As shown, the system 100 can comprise a network 140 to which one or more client devices 102 (two are shown but there can be fewer or more) and one or more remote host servers 150 (three are shown but there can be more or fewer) are connected. The network 140 can have one or more communication links 142 between client devices 102 and host servers 150. In some embodiments, the client devices 102 are on one side (sometimes referred to herein as the "client side") of such a communications link 142 or network 140, and the host servers 150 are on an opposite side (sometimes referred to herein as the "server side") of the communications link 142 or network 140. In some embodiments, the communications link 142 is a relatively high latency link such as a satellite link The communications link 142, however, need not be high latency, and the invention is not limited to operating over a satellite link A client device 102 can be a computing device such as a desktop or laptop personal computer, a smart cellular telephone, a tablet device, or the like. As such, a client device 102 can comprise any of the hardware and software modules typical of such devices. In FIG. 1, client device 102a is depicted as comprising a plurality of applications 120, a generation information cache 122, a client-side pre-connect module 124, an interceptor 126, and a pre-responses cache 128.

Each application 120 can be, for example, a software module such as one would expect to be on any of the above-mentioned computing devices. One or more of the applications 120 on a device 102 can include the ability to establish a persistent connection with a remote host server 150 by a prearranged handshake process that includes at least a connection request by the client device 102 and a connection response by the host server 150 in which the connection request and the connection response comply with the prearranged handshake protocol. Thus, upon receiving a connection request from a client device 102, a host server 150 determines whether the connection request complies with the handshake protocol. If so, the host server 150 generates and sends back to the client device 102 a connection response. Only if the client device 102 determines that the connection response complies with the protocol and is otherwise acceptable does the client device 102 continue with any remaining steps in the handshake. Only after all steps in the handshake protocol are completed is a persistent connection established between the device 102 and the remote host server 150.

Examples of applications 120 that typically include a capability of establishing persistent connections with remote host servers 150 include applications that execute a network transaction that involves the client device fetching resources or services from multiple different host servers. For example, the application 120 may establish a persistent connection with one or more (e.g., all) of the host servers 150 from which it fetches an initial parent resource and subsequent additional resources as part of executing the network transaction. A web browser is an example of such an application 120, and requesting and rendering a web page (which is an example of a parent resource) is an example of such a network transaction. A media player is another example of such an application 120, and requesting and consuming a media manifest (which is another example of a parent resource) is another example of a network transaction.

As will be seen, the pre-responses cache 128, client-side pre-connect module 124, interceptor 126, and generation information cache 122 can work with a server-side pre-connect module 152 and, in some embodiments, a hinting service 154, to elicit pre-connect responses from one or more host servers 150 and pre-position the pre-connect responses on the client-side of the network 140 so that, when a client device 102 later generates an actual connection request directed to the same host server 150, a valid connection response in the form of a pre-connect response previously generated by the host server 150 is already cached on the client-side of the network 140.

In FIG. 1, the pre-responses cache 128, client-side pre-connect module 124, interceptor 126, and generation information cache 122 are illustrated as modules of client device 102a. In other embodiments, one or more of those modules can alternatively be in a separate computing device such as a client proxy device 130 to which the client device 102a is connected. For example, in some embodiments, the pre-connect module 124, interceptor 126, and/or pre-responses cache 128 can be in a client proxy device 130 that is separate from the client device 102a but nevertheless on the client-side of the network 140. Although not shown, client device 102b can be configured like client device 102a.

The network 140 can comprise a single network of interconnected computing devices, a plurality of interconnected single networks, or the like. For example, the network 140 can comprise one or more local area networks (LANs), wide area networks (WANs), or the like. Individual networks that comprise the network 140 can be public and/or private. All or part of the network 140 can be part of the world-wide web (a.k.a. the public Internet). In some embodiments, the network 140 can be the public Internet.

The network 140 can be a packet switched network comprising a plurality of interconnected devices such as routers, switches, bridges, or the like. As such, the network 140 can interconnect one device (e.g., client device 102a) to another device (e.g., host server 150a) by routing data packets from one of the devices through the network 140 to the other device. Moreover, persistent connections between network devices (e.g., client device 102a and 150a) can be created using known network protocols. For example, a connection can be established over the network 140 between a socket of one device (e.g., client devices 102a or 102b, host servers 150a-c, and/or a device or devices hosting server-side pre-connect module 152 and the hinting service 154) and a socket of another device of those devices. Regardless, the connection can be set up in accordance with a networking protocol including the requirements of a corresponding handshake process for setting up and establishing the persistent connection. Examples of such protocols include the Hypertext Transfer Protocol (HTTP) or the Hypertext Transfer Protocol Secure (HTTPS). In some embodiments, the connection can be set up in accordance with a secure connection protocol such as Secure Sockets Layer (SSL) or Transport Layer Security (TLS). In some embodiments, the secure connection can be a data transport tunnel.

Host servers 150 can store and provide network resources, services, or the like to other entities (e.g., client devices 102) over the network 140. Examples of host servers 150 include web page servers, media servers, email servers, file transfer protocol (FTP) servers, or the like. Examples of resources or services a host server 150 might provide include web pages, images, audio files, video files, text files, streaming content, or the like.

The hinting service 154 can be configured to provide services that may be used to accelerate execution of a network transaction. In some embodiments, each time a device (e.g., client device 102b) that is subscribed to the hinting service 154 completes a network transaction, the hinting service 154 collects information regarding the network transaction and generates hints that can thereafter be used by another subscribing device (e.g., client device 102a) to execute the same network transaction more efficiently and thus typically in a shorter amount of time. The server-side pre-connect module 152 can be configured to receive hints from the hinting service 154 for a particular network transaction and pre-connect host servers 150 identified in the hints. Thus, such hints can, among other items, include identifications of host servers 150 to which the client device 102 may or will need to connect while executing the network transaction.

Figure 4A:
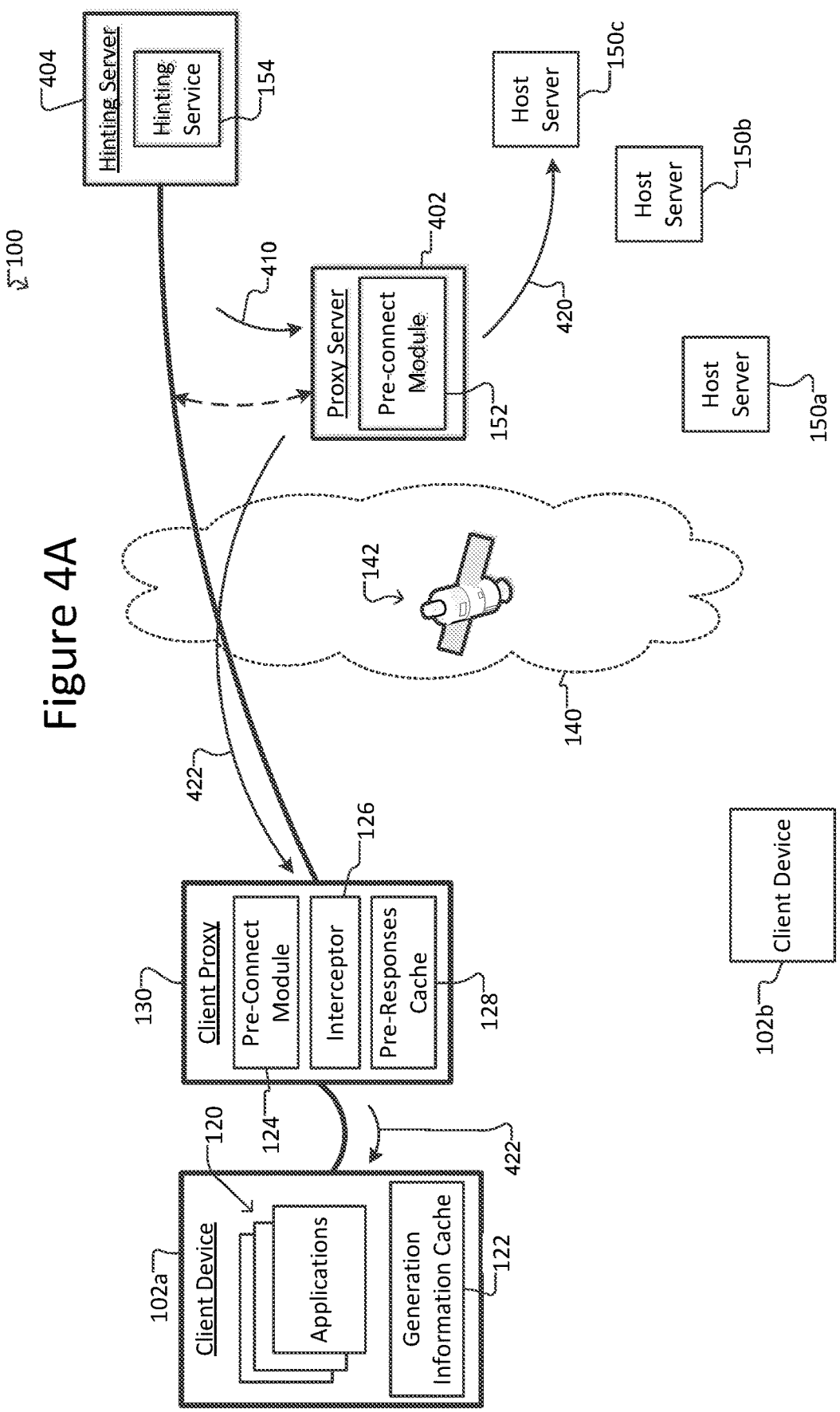
FIGS. 4A, 4B, and 5 illustrate a first example of the method of FIG. 3 according to some embodiments of the invention.
Figure 4B:
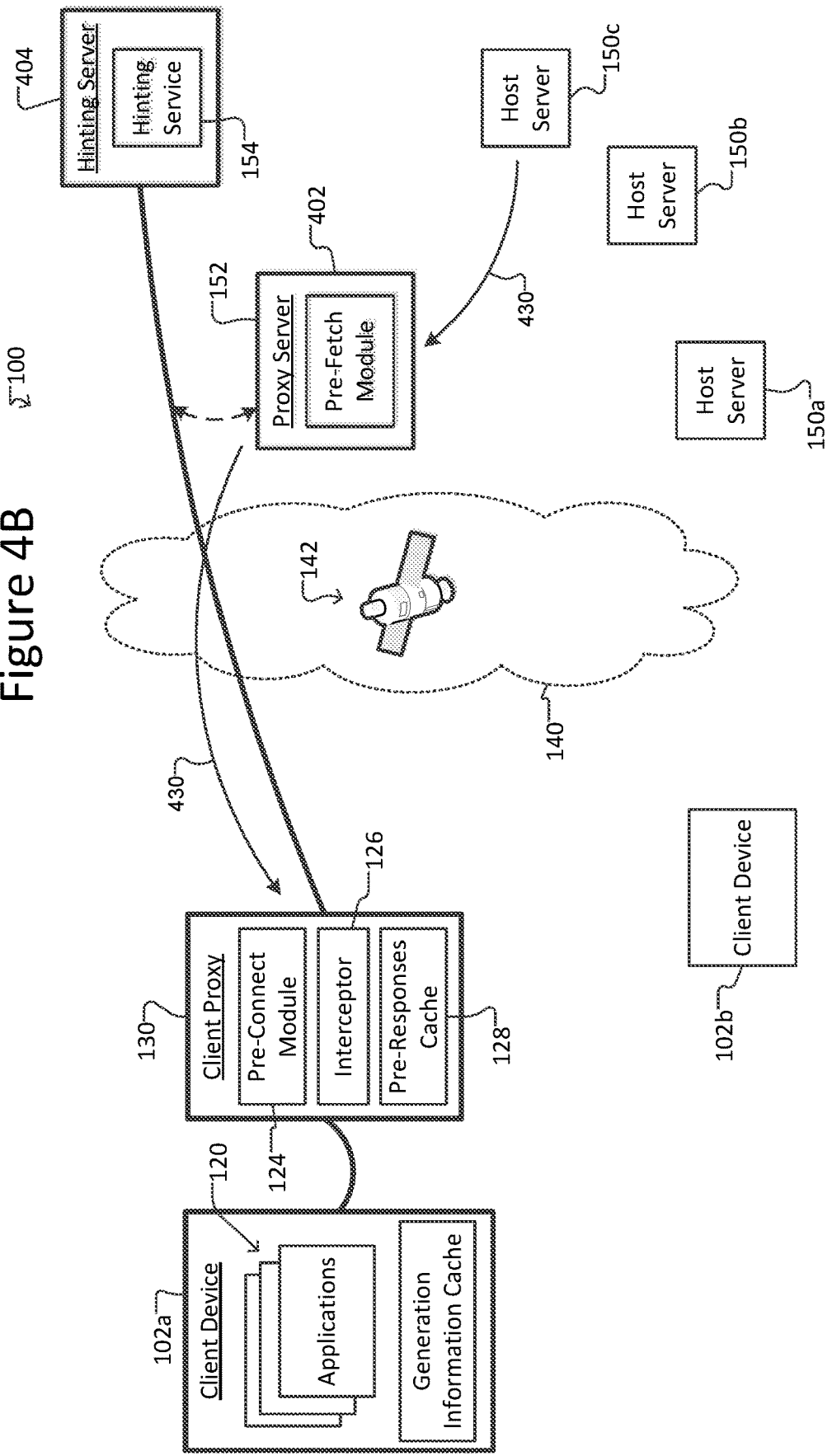
Figure 6A:
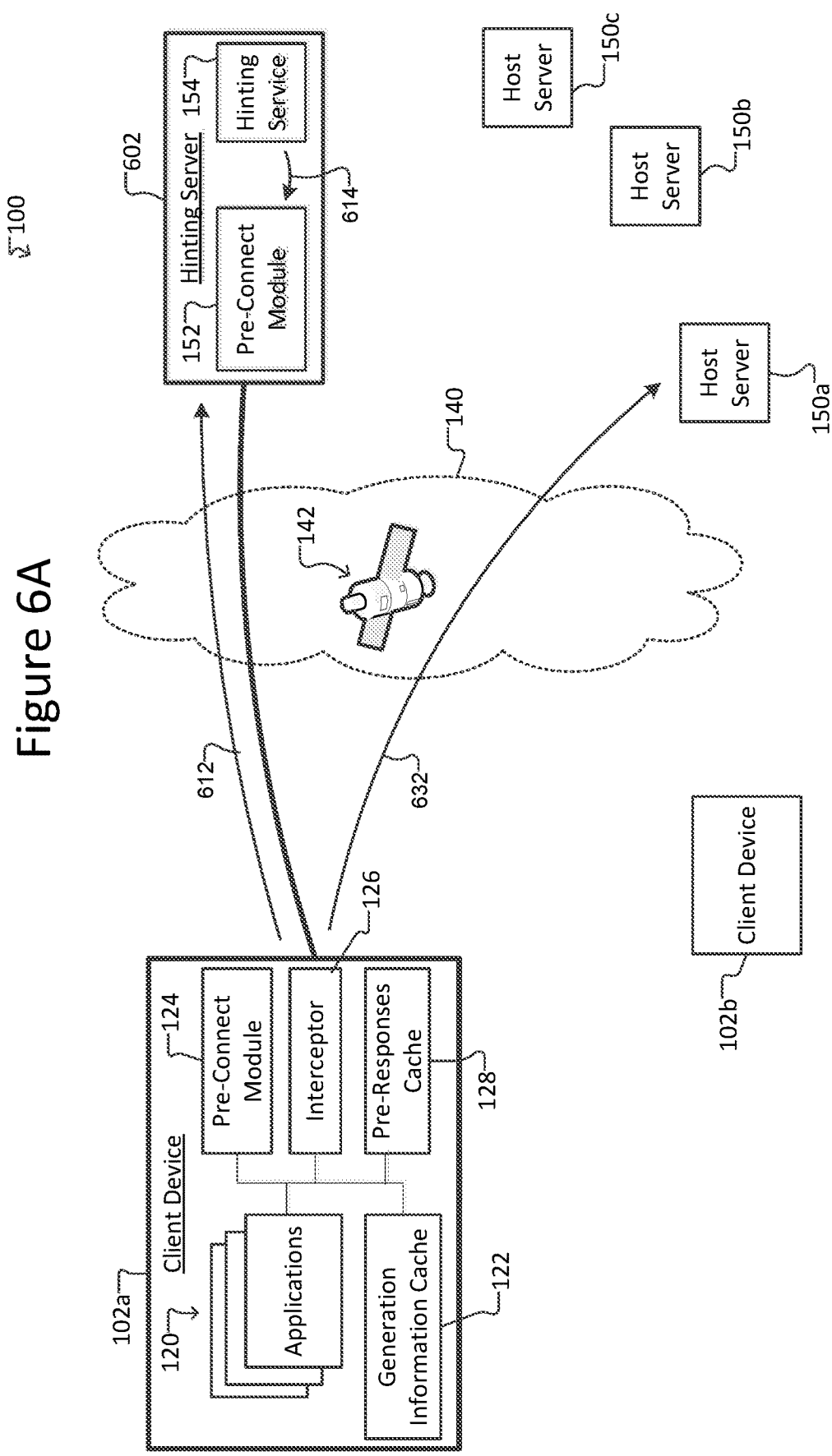
FIGS. 6A, 6B, 6C, and 7 illustrate a second example of the method of FIG. 3 according to some embodiments of the invention.
Figure 6B:
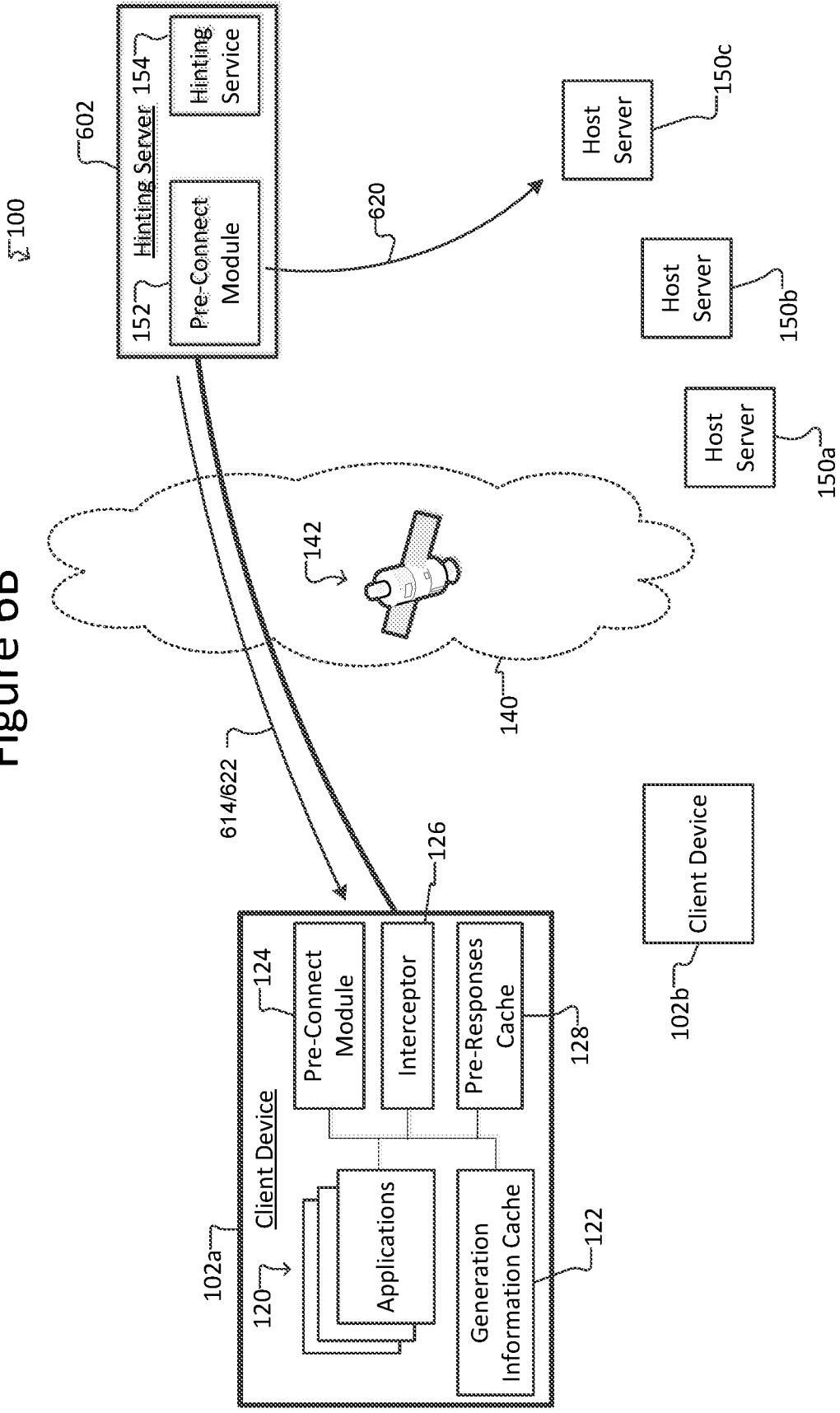
Figure 6C:
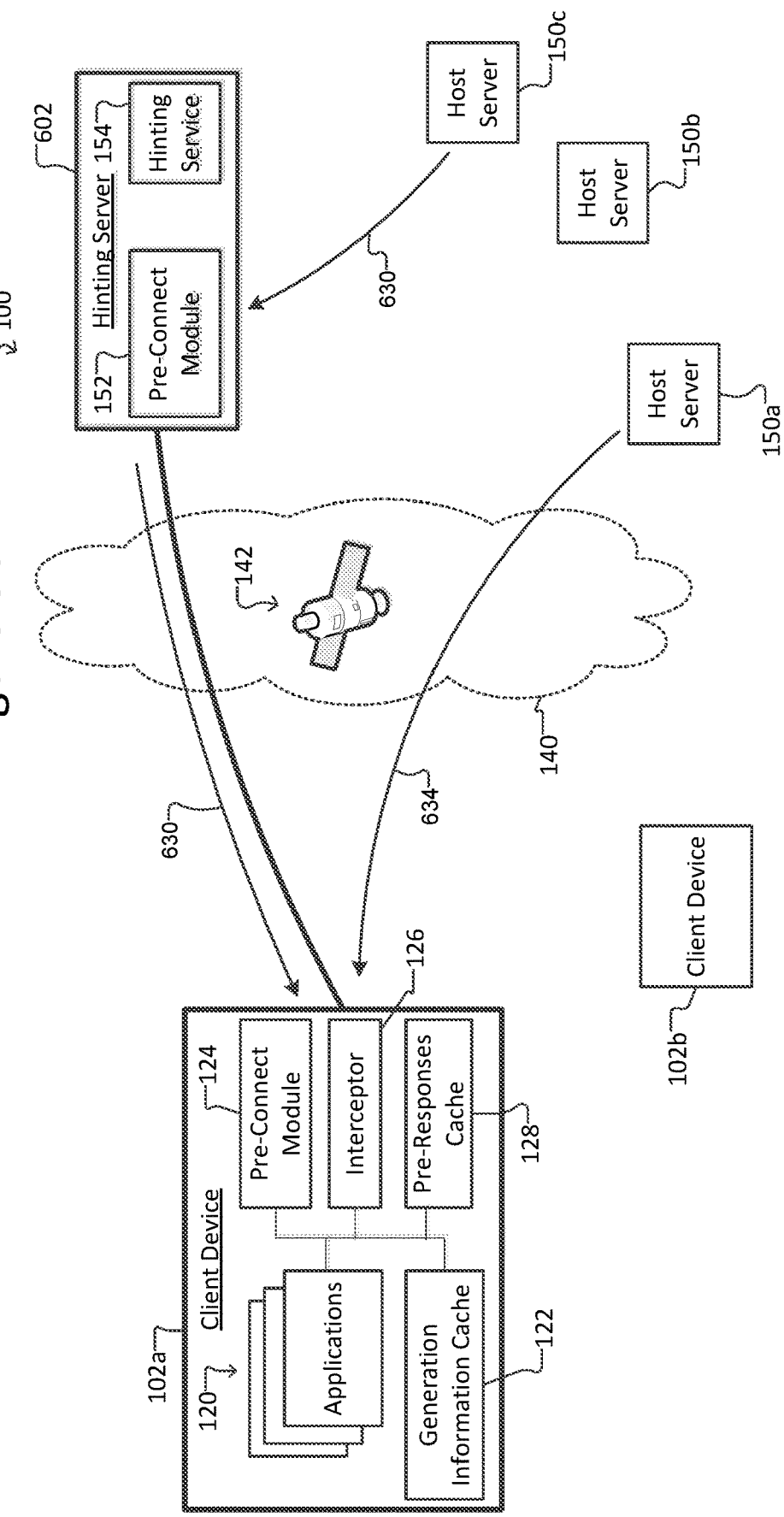

Although not shown in FIG. 1, the server-side pre-connect module 152 and the hinting service 154 can reside on one computing device or multiple computing devices. For example, the server-side pre-connect module 152 can reside on a proxy server (not shown in FIG. 1), and the hinting service 154 can reside on a hinting server (not shown in FIG. 1). An example of the foregoing is illustrated in FIGS. 4A and 4B. In other examples, the server-side pre-connect module 152 and the hinting service 154 can reside on the same computing device (not shown in FIG. 1). An example is illustrated in FIGS. 6A-6C. Regardless, the server-side pre-connect module 152 and hinting service 154 can be on the server-side of the communications link 142.

When an application 120 of a client device 102a has or is expected to begin executing a network transaction in which it will connect to one or more host servers 150, the server-side pre-connect module 152 can receive hints from the hinting service 154 that identify those host servers. When the serve-side pre-connect module 152 encounters an identification of such a host server (e.g., 150c) in the hints, or otherwise detects an event indicating a likelihood that the client device 102a will attempt to connect to the host server 150c, the server-side pre-connect module 152 can elicit a pre-connect response from the host server 150c that is sufficient to be a complete and valid response to a future connection request from the client device 102a. The server-side pre-connect module 152 can do so by generating a pre-connect request that complies with a handshake protocol for establishing a persistent connection. That is, the server-side pre-connect module 152 can generate a connection request that mimics, in relevant characteristics, a connection request that would be generated by the client device 102a. Then, when the host server 150c responds with a connection response, the server-side pre-connect module 152 can send the connection response (sometimes referred to herein as an "elicited pre-connect response" or simply a "pre-connect response") to client device 102a (e.g., the pre-connect module 124), which can locally store the elicited pre-connect response, for example, in the pre-responses cache 128.

The server-side pre-connect module 152 can generate a compliant pre-connect request by, for example, knowing one or more handshake protocols used by the client devices 102 and host servers 150. As another example, information for generating a pre-connect request can be in the hints.

The pre-connect request can comprise an identifier identifying the client device 102a as the requesting device, and the pre-connect request can be addressed to the host server 150c. In some embodiments, the pre-connect request also includes a randomly generated value. For example, to comply with some handshake protocols for establishing a secure connection, the pre-connect request may include a randomly generated number. Examples of protocols for establishing a secure connection that may include a field in the connection request for a random number include protocols that comply with SSL or TLS. A ClientHello message is an example of a connection request that can include a randomly generated number.

At least when the pre-connect request includes a randomly generated value, the server-side pre-connect module 152 sends to the client-side pre-connect module 124 not only the pre-connect response elicited from the host server 150c but generation information containing enough information for the client device 102a to later generate a connection request that is materially the same as the pre-connect request used to elicit the pre-connect response. Such information can include at least the random value included in the pre-connect request. Having now received both the pre-connect response elicited from the host server 150c and generation information indicating how the pre-connect request was generated, the client-side pre-connect module 124 locally stores that information, respectively, in the pre-responses cache 128 and the generation information cache 122.

Later, when an application 120 encounters a need to establish a connection with a host server 150 (e.g., while executing a network transaction), the application 120 initiates the handshake process by generating and sending to the host server (e.g., 150c) a connection request. In some embodiments, the application 120 may first determine whether generation information previously stored in the generation information cache 122 corresponds to the host server 150c. If the connection handshake protocol calls for a random value in the connection request and information regarding generation of a pre-connect request is locally stored in the generation information cache 122, the application 120 can generate the connection request with the same random value as was used in the pre-connect request. If no generation information corresponding to the host server 150c is in the generation information cache 122, the application 120 generates the connection request as it normally would. Regardless of which way the connection request is generated, the application 120 sends the connection request to the corresponding host server 150c.

The interceptor 126 intercepts connection requests from the application 120 and determines whether each connection request corresponds to a pre-connect response in the pre-responses cache 128. If yes, the interceptor 126 responds to the intercepted connection request with the cached pre-connect response. Because the cached pre-connect response is a valid response previously elicited from the host server 150c, as long as other requirements are met, the application 120 will accept the cached pre-connect response as a valid response from the host server 150c and will continue with the handshake process, for example, by sending an additional response back to the host server 150c. Because the cached pre-connect response is thus a valid response to the application's 120 connection request, the interceptor 126 can discard the intercepted connection request. If, on the other hand, the interceptor 126 does not find in the pre-responses cache 128 a pre-connect response that corresponds to the intercepted connection request, the interceptor 126 forwards the intercepted connection request to the corresponding host server 150c, which can then respond with a connection response in accordance with the handshake protocol.

Figure 2:
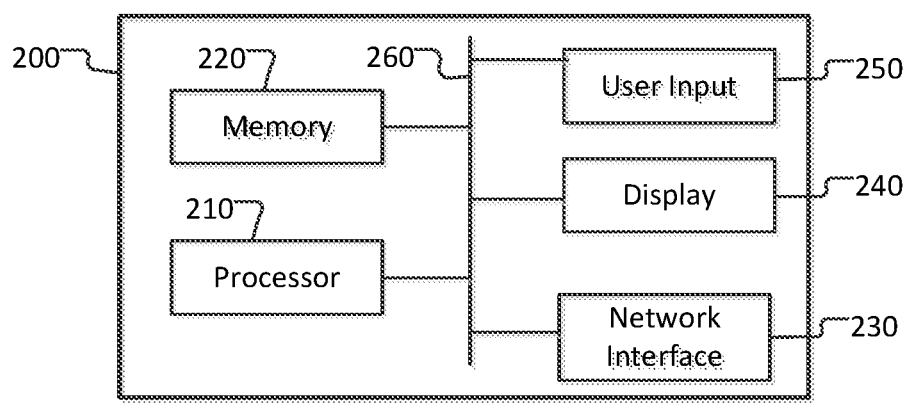
FIG. 2 shows an example of a computing device.

FIG. 2 illustrates an example computing device 200 suitable for use in system 100 of FIG. 1. Any one or more of the client devices 102 and/or host servers 150 can comprise a computing device that is the same as or similar to computing device 200 of FIG. 2. Likewise, if a client proxy 130 is included in system 100, the client proxy 130 can operate on a computing device like device 200. Likewise, the hinting service 154 and server-side pre-connect module 152 can operate on one or multiple distinct computing devices like 200.

As shown, the computing device 200 includes a processor 210, a memory 220, a network interface 230, a display 240, and one or more user input device 250. Each of these components is in communication with the other components via one or more communications buses 260. The computing device 200 illustrated in FIG. 2 is but an example, and many variations are possible. For example, while the example shown in FIG. 2 includes a user input device 250 and a display 240, such components are optional and may not be present in some examples, such as in some examples used as servers such as host servers 150 or one or more servers on which the hinting service 140 and/or the server-side pre-connect module 152 is located.

Suitable network interfaces 230 may employ wireless Ethernet, including 802.11 a, g, b, or n standards. In one example, the network interface 230 can communicate using Radio Frequency (RF), Bluetooth, CDMA, TDMA, FDMA, GSM, Wi-Fi, satellite, or other cellular or wireless technology. In other examples, the network interface 230 may communicate through a wired connection and may be in communication with one or more networks, such as Ethernet, token ring, USB, FireWire 1394, fiber optic, etc.

Any configuration of the memory 220 and processor 210 can be such that computer readable instructions (e.g., software, microcode, firmware, or the like) are stored in memory 220 as non-transient signals. Such instructions can cause the processor 210 to perform one or more functions, methods, or the like. For example, such instructions can cause the processor 210 to perform all or part of any of method 300 of FIG. 3, method 800 of FIG. 8, and/or method 1000 of FIG. 10. Alternatively, any configuration or instance of the computing device 200 can comprise hardwired logic (not shown) that causes the computing device 200 to perform all or any part of the foregoing methods. As yet another alternative, any configuration or instance of the computing device 200 can comprise a combination of computer readable instructions stored in the memory 220 that can be executed by the processor 210 and hardwired logic (not shown) that causes the computing device 200 to perform all or any part of the foregoing methods.

As noted, each client device 102, the client proxy 130 (if present), and the one or more computing devices on which the server-side pre-connect module 152 and hinting service 154 operate can comprise one or more computing devices like device 200. Each application 120, the client-side pre-connect module 124, the interceptor 126, the server-side pre-connect module 152, and/or the hinting service 154 can thus comprise hardwired logic (not shown) and/or non-transient computer readable instructions stored in memory 220 that can be executed by the processor 210 in one or more computing devices like 200. Similarly, the pre-responses cache 128 and the generation information cache 122 can be part of the memory 220 or a similar memory (not shown) of one or more computing devices like 200.

FIG. 3 illustrates an example of a method 300 for pre-connecting a client device (e.g., 102a) to a host server (e.g., 150c) by eliciting a pre-connect response from the host server 150c and pre-positioning the pre-connect response on the client-side of network 140. As will be seen with respect to method 800 of FIG. 8 and method 1000 of FIG. 10, the pre-positioned pre-connect response can be a complete and valid response to a later actual connection request by the client device 102a to the host server 150c.

For ease of illustration and discussion, method 300 is described as being performed on system 100 of FIG. 1 in which client device 102a is expected to initiate a future connection handshake with host server 150c. Two examples illustrated in FIGS. 4A-5 and 6A-7, respectively, of operation of method 300 are provided and discussed. Method 300 is not, however, limited to being performed on system 100, nor is method 300 limited to client device 102a being expected to initiate a connection with host server 150c. Nor is method 300 limited to the examples illustrated in FIGS. 4A-7.

At block 308, one or more indicators are encountered that indicate a possibility, a probability, or a certainty that a client device 102a will, at some point in the future, initiate a connection handshake with host server 150c. Such an indicator can take any of many possible forms and can arise in any of several possible scenarios.

For example, as illustrated by blocks 302 to 306, the indicators can be found in hints for a network transaction the client device 102 will or is expected to execute.

At block 302, an event occurs in system 100 that triggers a request to the hinting service 154 for hints for a particular network transaction. The event can be any event that indicates client device 102a has, might, or probably will initiate the network transaction.

The following are examples of events that can trigger a client device 102a to expressly request from the hinting service 154 hints for a particular network transaction. Using one of applications 120 (e.g., a web browser), a user of device 102a selects a universal resource locator (URL) of a particular web page or resource. As another example, the trigger can be an action that indicates a probability that the user will select a URL of a particular web page or resource. An example of such an action is a cursor of a user input device hovering over a selectable display of the URL on the client device 102a. Another example is an action that, due to the user's browsing history, indicates a probability that the URL will be selected by the user. For example, the browsing history may indicate that the user typically selects the URL upon or shortly after powering on the client device 102a, starting one of the applications 120, or the like. In the foregoing examples, rendering or otherwise executing the resource or resources identified by the URL is an example of a network transaction the client device 102a is expected to execute.

Examples of events that can trigger another system 100 device to request hints from the hinting service 154 include the following. A request by a client device 102a to a domain name system (DNS) server. A DNS request can be detected by proxy server 402, which then sends a hints request to the hinting service 154 for a network transaction associated with the DSN request. As another example, even if a client device 102a itself is not configured to request hints from the hinting service 154, a proxy server 402 can detect a request by the client device 102a to a host server 150a for a particular URL or resource, and the proxy server 402 can then request from the hinting service 154 hints associated with the network transaction that corresponds to the requested URL or resource.

At block 304, in response to the trigger detected at block 302, a request for hints associated with the particular network transaction is sent to the hinting service 154. The request for hints can originate from any of a number of possible sources including the client device 102a, a client proxy 130, the pre-connect module 152, or the like.

At block 306, assuming the hinting service 154 has hints for the network transaction, the hinting service 154 sends the hints. The hinting service 154 can send the hints to any of a number of possible entities including the client device 102a, the client proxy 130, the server-side pre-connect module 152, or the like. As will be seen, the hints can be forwarded to the client device 102a at block 320, which as shown, can be performed any time during process 300 after the hints are received from the hinting service 154.

The hints can, among other things, identify host servers to which the client device 102a is expected to connect as part of executing the network transaction. Processing a hints file and encountering such identifications of host servers is thus one example of encountering connection indicators at block 308. As yet example, block 308 can comprise the client device 102a itself indicating that it may or will establish a future connection with host server 150c. For example, client device 102a can send a pre-connect message to the server-side pre-connect module 152, which can thus be another example by which a connection indicator can be encountered at block 308.

Returning to block 308, it is noted that block 308 can be performed by a number of possible entities including the server-side pre-connect module 152. Alternatively, all or part of block 308 can be performed by the client proxy 130 or the client device 102a (e.g., the client-side pre-connect module 124, one of the applications 120, or the like).

Blocks 310 through 318 are now executed for each connection indicator encountered at block 308. Those blocks are now discussed for an example of an indicator that client device 102a will seek to establish a future connection with host server 150c.

At block 310, a pre-connect request is generated that is compliant with a handshake protocol for initiating a connection with a host server 150. For example, the pre-connect request is generated on behalf of the client device 102a and is addressed to the host server 150c. The pre-connect request can be said to mimic an actual connection request as such a request would be generated by client device 102a.

Block 310 can be performed by generating a pre-connect request that complies with the requirements of an initial connection request in accordance with a pre-agreed handshake protocol between the client devices 102 and the host servers 150. As noted, some protocols require that a random value (e.g., a randomly generated number) be included in an initial connection request. A ClientHello is an example of an initial connection request that is compliant with SSL or TLS protocols, and a ClientHello typically includes a field for a randomly generated number. Block 310 can thus comprise generating a random number and including the random number in the pre-connect request.

At block 312, information regarding generation of the pre-connect request is provided to the client-side pre-connect module 124 of client device 102a, which can store the generation information in cache 122. Alternatively, the generation information can be provided to an application 120, which stores the generation information in the generation information cache 122. Regardless, as will be seen, the client device 102a can use this information to generate a later actual connection request that is the same as the pre-connect request in material characteristics.

The generation information may take any of a number of forms. For example, if the pre-connect request includes one or more random value fields, the generation information can be the random value generated and included in the pre-connect request generated at block 310. Thus, if the pre-connect request generated at block 310 was a ClientHello message, the generation information can include the random number included in the ClientHello message. In some embodiments, the generation information can be part or all of the pre-connect request itself.

The generation information may be sent to the client device 102a at block 312 in any number of possible ways. For example, if the connection indicator encountered at block 308 was found in hints requested as part of blocks 302 to 306, the generation information may be added to the hints received from the hinting service 154 (see block 306). In such an embodiment, block 312 can thus be accomplished as part of sending, at block 320, the hints to the client device 102a. As another example, the generation information may be sent directly to the client device 102a (or proxy client 130) rather than in the hints as part of block 320. Regardless, the generation information can be cached in the generation information cache 122 at client device 102a.

At block 314, the pre-connect request generated at block 310 is sent to the corresponding host server 150c. As noted, the pre-connect request is, in material characteristics, the same as a connection request that would be generated by the client device 102a. The pre-connect request thus mimics an actual connection request from client device 102a. When the host server 150c receives the pre-connect request, it responds with a pre-connect response that is, in material characteristics, the same as a connection response it would generate in response to an actual connection request from client device 102a. If, for example, the pre-connect request generated at block 310 was a ClientHello message compliant with an SSL/TLS protocol, the pre-connect response generated by host server 150c as part of block 316 is a ServerHello message that is compliant with the same protocol.

At block 316, the pre-connect response is received from the host server 150c, and at block 318, the pre-connect response of block 316 can be pre-positioned on the client side of network 140. Block 318 can be performed, for example, by sending the pre-connect response received at block 316 to the client-side pre-connect module 124, which can locally store the pre-connect response in the pre-responses cache 128 of client device 102a.

In some embodiments, blocks 308 through 318 can be performed by the server-side pre-connect module 152. In other embodiments, one or more of blocks 308 through 318 can be performed in part or whole by another entity of system 100 such as the client-side pre-connect module 124 of the client device 102a, one or more of the applications 120 in the client device 102a, or the like.

At this point, method 300 has generated on behalf of client device 102a a pre-connect request that is compliant with a handshake protocol for establishing a connection with host server 150c. Host server 150c has treated the pre-connect request as a connection request from client device 102a and responded with a pre-connect response that is also compliant with the handshake protocol. The pre-connect response from the host server 150c and information sufficient for the client device 102a to generate later an actual connection request that is the same, in material characteristics, as the pre-connect request has been stored on the client-side of the network 140. As noted, blocks 310-318 can be repeated for each connection indicator encountered as part of block 308, which can elicit and pre-position at the client device 102a pre-connect responses from multiple servers 150.

As will be seen in discussing the methods 800 and 1000 of FIGS. 8 and 10, when the client device 102a later seeks to initiate an actual connection with host server 150c, the client device 102a can use the locally stored pre-connect request generation information to generate an actual connection request that is materially the same as the pre-connect request. The locally stored pre-connect response can then be a complete response to the actual connection request, obviating the need—and thus saving the time—for the actual request to travel across the network (including link 142) to the host server 150c, the host server 150c o generate a connect response, and the connection response to travel back across the network to the client device 102a.

Figure 7:
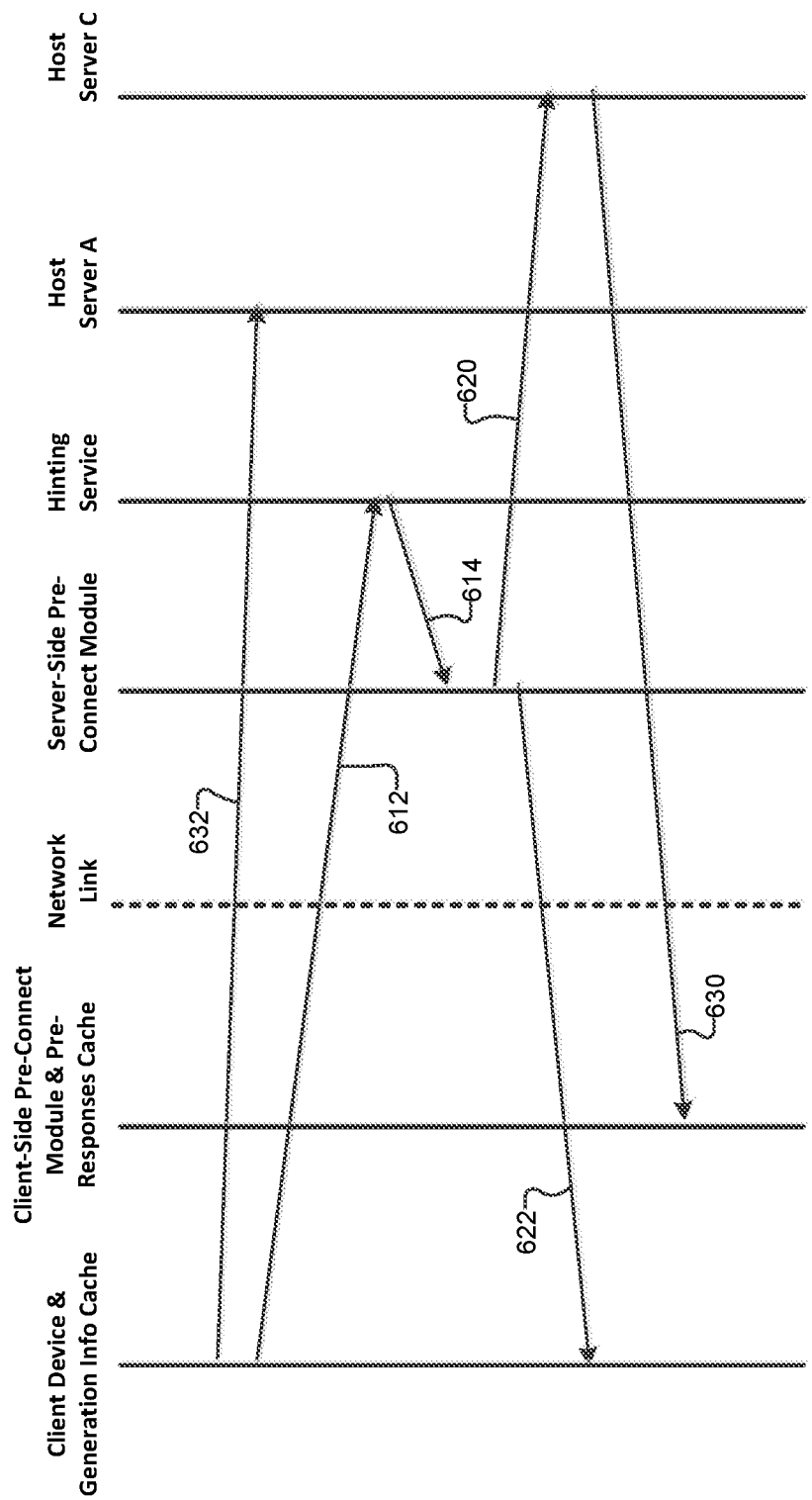
Figure 8:
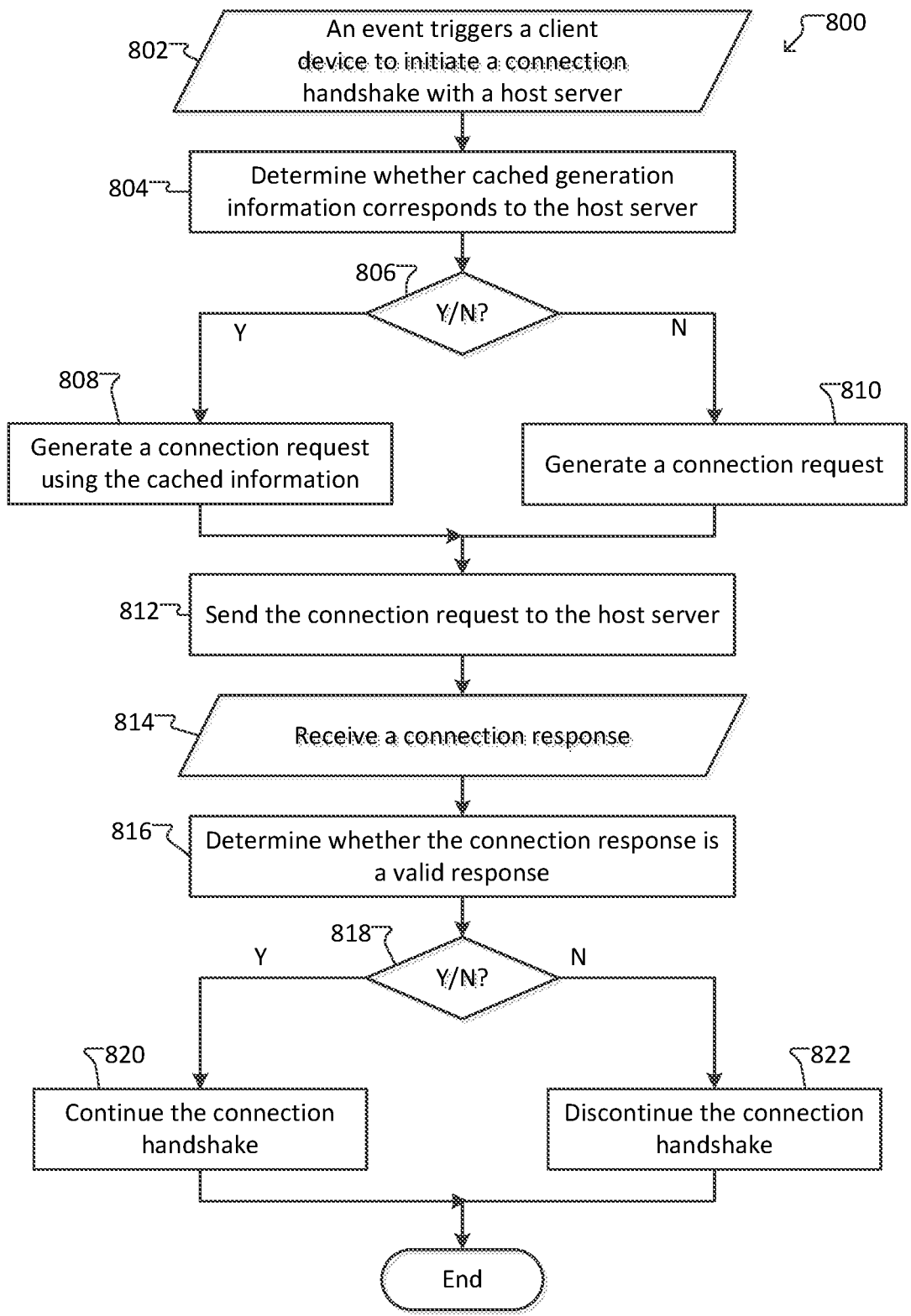
FIG. 8 illustrates an example of a method by which a client device utilizes locally stored generation information, if available, to generate connection requests addressed to remote host servers according to some embodiments of the invention.

Before turning to the methods 800 and 1000 of FIGS. 8 and 10, two examples illustrated, respectively, in FIGS. 4A-5 and FIGS. 6A-7 of operation of method 300 of FIG. 300 are discussed.

Figure 5:
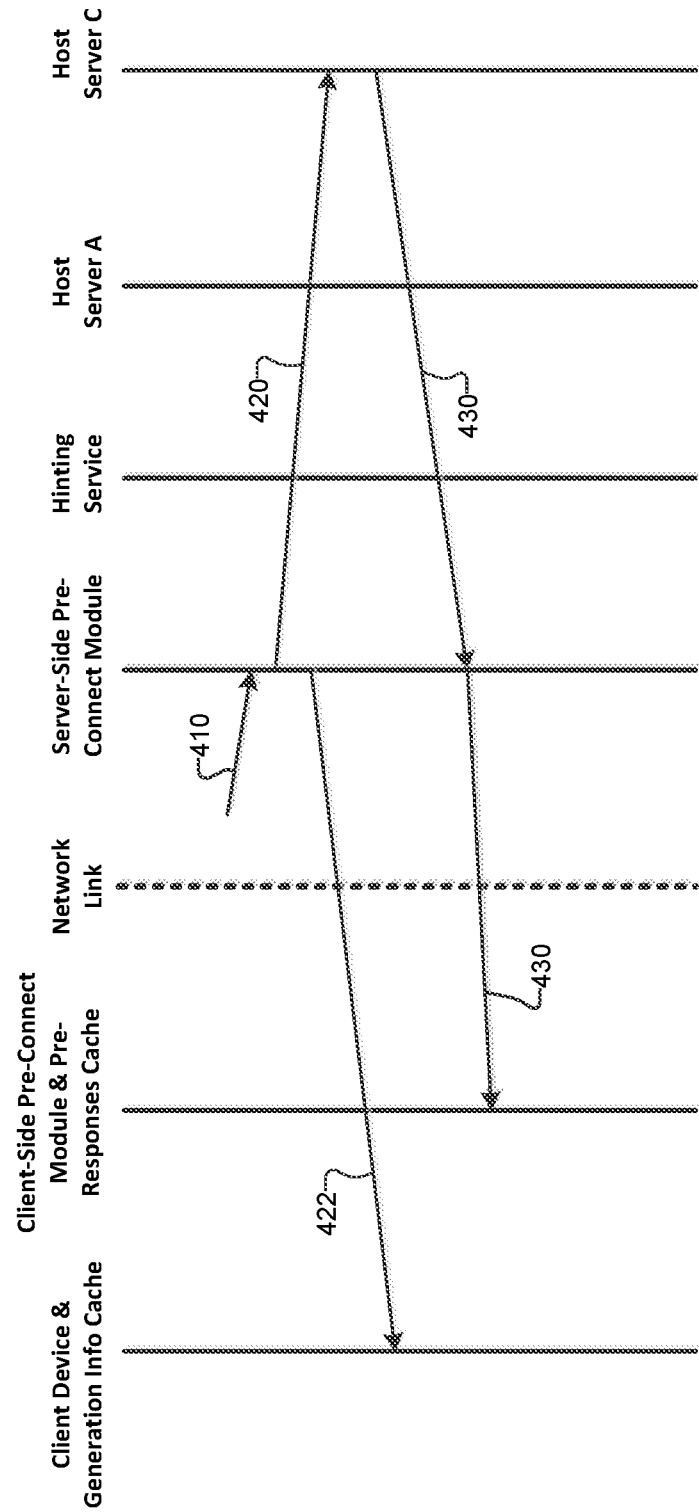

FIGS. 4A-5 illustrate a first example of operation of method 300 in which system 100 is configured with the pre-connect module 152 on a proxy server 402 and the hinting service 154 on a distinct hinting server 404. In the first example, the proxy server 402 can "snoop" communications to and from the hinting server 404 and/or other devices on the network 140 such as one or more of the host servers 150.

As illustrated in FIGS. 4A and 5, in the first example, the pre-connect module 152 in the proxy server 402 encounters a connection indicator 410 (block 308 of FIG. 3) indicating that client device 102a is expected to initiate a future connection handshake with host server 150c. The connection indicator 140 can be any of the examples discussed above with respect to block 308. As also illustrated in FIGS. 4A and 5, the server-side pre-connect module 152 responds by generating and sending to host server 150c a pre-connect request 420 (an example of blocks 310 and 314 of FIG. 3). As also shown, the server-side pre-connect module 152 provides generation information 422 indicative of how the pre-connect request 420 was generated to client device 102a (an example of block 312), which can be locally stored in the generation information cache 122 of client device 102a.

As shown in FIGS. 4B and 5, the host server 150c responds with a pre-connect response 430, which is received by the server-side pre-connect module 152 (an example of block 316) and sent to the pre-connect module 124 of client device 102a, where the pre-connect response 430 can be stored in the pre-responses cache 128 (an example of block 318).

As best seen in FIG. 5, a pre-connect response 430 has been elicited from host server 150c with a pre-connect request 420. The pre-connect response 430 has been stored in a pre-responses cache 128 local to the client device 102a, and information 422 indicating how to generate a connection request that is the same as the pre-connect request 420 has been stored in a generation information cache 122 local to the client device 102a.

FIGS. 6A-7 illustrate a second example of operation of method 300 in which system 100 is configured with the pre-connect module 152 and the hinting service 154 on the same server device 602. In the foregoing configuration, communications between a client device 102 and the hinting server 602 can be encrypted.

As shown in FIGS. 6A and 7, in the second example, the client device 102a initiates a network transaction by requesting 632 a parent resource (e.g., a web page) from a host server (e.g., 150a). At about the same time, the client device 102a can send a request 612 for hints for the network transaction to the hinting service 154. The hinting service 154 responds by providing the requested hints 614 to the pre-connect module 152. (The foregoing is an example of operation of method 300 at blocks 302-306.)

As noted, the hints 614 can include, among other elements, an identification of host servers to which the client device 102a is expected to establish a connection as part of the network transaction. In the second example, the pre-connect module 152 finds in the hints 614 an indication that client device 102a is expected to attempt to establish a future connection with host server 150c. (This is an example of block 308 of FIG. 3.) As shown in FIGS. 6B and 7, the pre-connect module 152 consequently generates a pre-connect request 620 to host server 150c on behalf of client device 102a. The pre-connect module 152 also inserts into the hints 614 generation information 622 indicating how the pre-connect request 620 was generated, and the pre-connect module 152 sends the hints 614 with the inserted generation information 622 to the client device 102a. (This is an example of blocks 310, 312, and 320 in FIG. 3.) As also shown in FIGS. 6B and 7, the pre-connect module 152 sends the pre-connect request 620 to host server 150c (an example of block 314 of FIG. 3). As shown in FIGS. 6C and 7, the host server 150c responds with a pre-connect response 630, which is forwarded to client device 102a, where it can be stored in the pre-responses cache 128 (examples of blocks 316 and 318 of FIG. 3). In the meantime, host server 150a responds to the request 632 (see FIG. 6A) for the parent resource by sending the parent resource 634 to client device 102a.

As best seen in FIG. 7, a pre-connect response 630 has been elicited from host server 150c with a pre-connect request 620. The pre-connect response 630 has been stored in a pre-responses cache 128 on the client-side of the network 140, and information 622 indicating how to generate a connection request that is the same as the pre-connect request 620 has been stored in a generation information cache 122 on the client-side of the network 140.

As noted above, FIGS. 8 and 9 illustrate examples of methods 800 and 900 by which a client device 102a (and/or a client proxy 130 if included in system 100) utilizes pre-positioned pre-connect responses from host servers 150 to accelerate establishing a connection with the host servers. For ease of illustration and discussion, methods 800 and 900 are described as being performed on the system 100 of FIG. 1 in which client device 102a utilizes a pre-connect request pre-positioned by method 300 to accelerate establishing a connection with host server 150c. The two examples illustrated in FIGS. 4A-5 and 6A-7 are continued in FIG. 9, which illustrates operation of methods 800 and 900 on example 1 of FIGS. 4A-5 and example 2 of FIGS. 6A-7. Neither method 800 nor method 900, however, is limited to being performed on system 100. Likewise, neither method 800 nor 900 is limited to client device 102a establishing a connection with host server 150c. Nor are methods 800 and 900 limited to the example illustrated in FIG. 9.

As illustrated by block 802, an event triggers a client device 102a to initiate a handshake process for establishing an actual connection with host server 150c. The triggering event in block 802 can be anything that causes the client device 102a to seek a persistent connection with host server 150c. For example, as part of executing the network transaction (e.g., rendering a web page, playing pieces of a media object identified in a manifest, or the like) noted in block 302 of FIG. 3, the client device 102a may encounter an instruction that directly or indirectly causes client device 102a to initiate a connection with host server 150c. An example is an instruction to fetch a resource from host server 150c. Such an instruction can be in the form of a URL.

At block 804, method 800 determines whether generation information for a connection request to the host server 150c is locally stored at the client device 102a. For example, the method 800 can determine whether generation information for a pre-connect request to the host server 150c is stored in the generation information cache 122 of client device 102a. Any such generation information would have been provided to client device 102a as part of block 312 of FIG. 3.

If the determination at block 804 is yes, the method 800 branches at block 806 to block 808, where the method 800 generates a connection request to the host server 150c utilizing the generation information. As discussed above, the generation information is sufficient to generate the connection request to be the same as the pre-connect request that was previously generated at block 310 of FIG. 3 and used to elicit a pre-connect response from the host server 150c. As also noted, if the handshake protocol includes a random value field in the connection request, the generation information contains the previously used randomly generated value, which is used at block 808 to generate a connection request having the same randomly generated value.

If the determination at block 804 is no, the method 800 branches at block 806 to block 810, where method 800 generates a connection request to host server 150c in accordance with the handshake requirements of the relevant connection protocol.

From block 808 or block 810, the method 800 proceeds to block 812, where method 800 sends the connection request generated at block 808 or 810 to the host server 150c. Block 902 of method 900 intercepts the connection request and, at block 904, determines whether there is a locally stored pre-connect response that corresponds to the intercepted connection request. For example, the method 900 can determine whether a pre-connect response stored in the pre-responses cache 128 corresponds to the intercepted connection request.

The method 900 can match the intercepted connection request to pre-connect responses stored in the pre-responses cache 128 in any of a number of ways. For example, the method 900 can compare all or a portion (e.g., the random value) of the connection request intercepted at block 902 to a corresponding portion of the pre-fetched responses stored in the pre-responses cache 128. The method 900 can, for example, compare one or more values in fields in the intercepted connection request to values in corresponding or complimentary fields in the pre-connect responses in the pre-responses cache 128. For example, method 900 can determine at block 804 that an intercepted connection request corresponds to a cached pre-connect response if one or more of the following is true: the destination network (e.g., internet protocol (IP)) address of the intercepted connection request matches the source network (e.g., IP) address of a pre-connect response in the pre-responses cache 128, the destination socket number of the intercepted connection request matches the source socket number of a pre-connect response in the pre-responses cache 128, or the like.

If the method 900 finds, at block 904, a cached pre-connect response that corresponds to the intercepted connection request, the method 900 branches at block 906 to block 908, where method 900 provides to client device 102a the corresponding pre-connect response as a complete and fully compliant connection response to the intercepted connection request. Consequently, at block 912, the method 900 can discard the intercepted connection request.

If, however, the method 900 does not find at block 904 a corresponding cached pre-connect response, the method 900 branches at block 906 to block 910, where the method 900 forwards the intercepted connection response to the host server 150c. Although not shown in the figures the host server 150c will receive the connection request and respond with a connection response.

Returning to method 800 of FIG. 8, at block 814, method 800 receives a response to the connection request that was sent to host server 150c at block 812. The response received at block 814 is thus either the cached pre-connect response provided by method 900 at block 908 or the connection response generated by the host server 150c in response to the intercepted connection request forwarded to the host server 150c at block 910 of FIG. 9.

At block 816, method 800 determines whether the received connection response is valid and compliant with the relevant handshake protocol. If the determination at block 816 is yes, the method 800 continues with the connection handshake process at block 820 and, assuming any additional steps in the handshake process are successful, completes the handshake and thus establishes a persistent connection with the host server 150c. If the determination at block 816 is no, the method 800 discontinues the handshake process at block 822. Consequently, a connection is not established with host server 150c.

FIG. 10 illustrates operation of methods 800 and 900 with respect to the first and second examples illustrated in FIGS. 4A-7 and discussed above. As discussed above and illustrated in FIGS. 5 and 7, operation of method 300 in both the first example and the second example pre-positioned a pre-connect response (430 in example 1 and 630 in example 2) from host server 150c in the pre-responses cache 128 at client device 102a or client proxy 130 and generation information (422 in example 1 and 622 in example 2) indicating how the pre-connect request that elicited the pre-connect response was generated was stored in the generation information cache 122 of client device 102a.

In FIG. 10, an event 1002 is illustrated that triggers the client device 102a to initiate a connection handshake with host server 150c. In example 1, the event 1002 is not specified but can be any event that would cause the client device 102a to seek to establish a connection with host server 150c. In example 2, the event 1002 is the client device 102a encountering in the parent resource 634 (see FIGS. 6C and 7) an instruction (e.g., a URL) to fetch a resource from host server 150c. Regardless, event 1002 in FIG. 10 is an example of block 802 of FIG. 8.

At block 804 of FIG. 8, in example 1, the method 800 finds in the generation information cache 122 generation information regarding the pre-fetch request 422 to host 150c. In example 2, the method 800 finds generation information for pre-fetch request 622 to host 150c. In both examples 1 and 2, the method 800 therefore branches to block 808, where method 800 uses generation information 422 or 622 to generate a connection request 1004 that is the same as pre-connect request 422 (example 1) or pre-connect request 622 (example 2). At block 812, the method 800 sends the connection request 1004 to host server 150c. Method 900 of FIG. 9 then intercepts the connection request at block 902. At block 904, method 900 finds in the pre-connect responses cache 128 a corresponding pre-connect response 430 in example 1 or 630 in example 2 and branches to block 908, where method 900 provides the pre-connect response 430/630 to client device 102a as a complete response to the intercepted connection request 1004, which is discarded at block 912.

Although specific embodiments and applications have been described in this specification, these embodiments and applications are exemplary only, and many variations are possible. In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

We claim:

1. A method of accelerating setup of a persistent connection over a network between a client device and a remote host server, where establishing the connection requires a connection request by the client device and a corresponding connection response by the remote host server, the method comprising:
  intercepting, by an interceptor module on a client-side of the network, a connection request to establish a persistent connection over the network generated by the client device for a connection with the remote host server;
  determining, by the interceptor module, whether a pre-connect response to establish the persistent connection from the remote host server is stored on the client-side of the network and corresponds to the intercepted connection request; and
  responsive to determining that the pre-connect response from the remote host server is stored on the client-side of the network and corresponds to the intercepted connection request, providing the pre-connect response to the client device as a complete response to the intercepted connection request.

2. The method of claim 1 further comprising, responsive to determining that the pre-connect response from the remote host server is not stored on the client-side of the network or does not correspond to the intercepted connection request, forwarding the intercepted connection request over the network to the remote host server.

3. The method of claim 2, wherein, responsive to determining that the pre-connect response from the remote host server is stored on the client-side of the network and corresponds to the intercepted connection request, discarding the intercepted connection request.

4. The method of claim 1, wherein the determining is affirmative if a source of the pre-connect response and a destination of the intercepted connection request are both the remote host server.

5. The method of claim 1, wherein the determining is affirmative if:
  a source network address of the pre-connect response and a destination network address of the intercepted connection request are a network address of the remote host server; and
  a socket associated with the source network address of the pre-connect response matches a socket associated with the destination network address in the intercepted connection request.

6. The method of claim 1 further comprising:
  generating, by the client device, the connection request; and
  sending, by the client device, the connection request addressed to the remote host server.

7. The method of claim 1, wherein the connection request is a request for a secure connection with the remote host server.

8. The method of claim 1, wherein the network includes a satellite link between the client device and the remote host server.

9. The method of claim 1, wherein:
  the client device comprises a web browser,
  the connection request is from the web browser rendering a web page, and
  the web page comprises an instruction to fetch a resource from the remote host server.

10. The method of claim 9, wherein:
  the web page is stored on a web server located on a host server side of the network, and
  the remote host server is different than the web server.

11. An apparatus, disposed on a client-side of a communications network, for accelerating setup of a persistent connection over the network between a client device and a remote host server, where establishing the connection requires a connection request by the client device and a corresponding connection response by the remote host server, the apparatus comprising:
  processor circuitry; and
  non-transitory digital storage having stored therein instructions that cause the processor circuitry to:
    intercept a connection request to establish a persistent connection over the network generated by the client device for a connection with the remote host server;
    determine whether a pre-connect response to establish the persistent connection from the remote host server is stored on the client-side of the network and corresponds to the intercepted connection request; and
    responsive to a determination that the pre-connect response from the remote host server is stored on the client-side of the network and corresponds to the intercepted connection request, provide the pre-connect response to the client device as a complete response to the intercepted connection request.

12. The apparatus of claim 11, wherein the non-transitory digital storage further has stored thereon instructions that cause the processor circuitry to, responsive to a determination that the pre-connect response from the remote host server is not stored on the client-side of the network or does not correspond to the intercepted connection request, forwarding the intercepted connection request over the network to the remote host server.

13. The apparatus of claim 12, wherein the non-transitory digital storage further has stored thereon instructions that cause the processor circuitry to, responsive to theta determination that the pre-connect response from the remote host server is stored on the client-side of the network and corresponds to the intercepted connection request, discard the intercepted connection request.

14. The apparatus of claim 11, wherein the determination that the pre-connect response from the remote host server is stored on the client-side of the network and corresponds to the intercepted connection request is affirmative if a source of the pre-connect response and a destination of the intercepted connection request are both the remote host server.

15. The apparatus of claim 11, wherein the determination that the pre-connect response from the remote host server is stored on the client-side of the network and corresponds to the intercepted connection request is affirmative if:
  a source network address of the pre-connect response and a destination network address of the intercepted connection request are a network address of the remote host server; and
  a socket associated with the source network address of the pre-connect response matches a socket associated with the destination network address in the intercepted connection request.

16. The apparatus of claim 11, wherein the non-transitory digital storage further has stored thereon instructions that cause the processor circuitry to:
  generate the connection request; and
  send the connection request addressed to the remote host server.

17. The apparatus of claim 11, wherein the connection request is a request for a secure connection with the remote host server.

18. The apparatus of claim 11, wherein the network includes a satellite link between the client device and the remote host server.

19. The apparatus of claim 11, wherein:
the client device comprises a web browser,
the connection request is from the web browser rendering a web page, and
the web page comprises an instruction to fetch a resource from the remote host server.

20. The apparatus of claim 19, wherein:
the web page is stored on a web server located on a host server side of the network, and the remote host server is different than the web server.

21. A non-transitory computer-readable medium having encoded thereon computer software for accelerating setup of a persistent connection over a network between a client device and a remote host server, where establishing the connection requires a connection request by the client device and a corresponding connection response by the remote host server, the non-transitory computer-readable medium comprising processor-executable instructions configured to cause a processor to:
intercept a connection request to establish a persistent connection over the network generated by the client device for a connection with the remote host server;
determine whether a pre-connect response to establish the persistent connection from the remote host server is stored on a client-side of the network and corresponds to the intercepted connection request; and
responsive to a determination that the pre-connect response from the remote host server is stored on the client-side of the network and corresponds to the intercepted connection request, provide the pre-connect response to the client device as a complete response to the intercepted connection request.

22. The non-transitory computer-readable medium of claim 21, wherein the non-transitory computer-readable medium further comprising processor-executable instructions configured to cause a processor to, responsive to a determination that the pre-connect response from the remote host server is not stored on the client-side of the network or does not correspond to the intercepted connection request, forwarding the intercepted connection request over the network to the remote host server.

23. The non-transitory computer-readable medium of claim 22, wherein the non-transitory computer-readable medium further comprising processor-executable instructions configured to cause a processor to, responsive to theta determination that the pre-connect response from the remote host server is stored on the client-side of the network and corresponds to the intercepted connection request, discard the intercepted connection request.

24. The non-transitory computer-readable medium of claim 21, wherein the determination that the pre-connect response from the remote host server is stored on the client-side of the network and corresponds to the intercepted connection request is affirmative if a source of the pre-connect response and a destination of the intercepted connection request are both the remote host server.

25. The non-transitory computer-readable medium of claim 21, wherein the determination that the pre-connect response from the remote host server is stored on the client-side of the network and corresponds to the intercepted connection request is affirmative if:
a source network address of the pre-connect response and a destination network address of the intercepted connection request are a network address of the remote host server; and
a socket associated with the source network address of the pre-connect response matches a socket associated with the destination network address in the intercepted connection request.

26. The non-transitory computer-readable medium of claim 21, wherein the non- transitory computer-readable medium further comprising processor-executable instructions configured to cause a processor to:
generate the connection request; and
send the connection request addressed to the remote host server.

27. The non-transitory computer-readable medium of claim 21, wherein the connection request is a request for a secure connection with the remote host server.

28. The non-transitory computer-readable medium of claim 21, wherein the network includes a satellite link between the client device and the remote host server.

29. The non-transitory computer-readable medium of claim 21, wherein:
the client device comprises a web browser,
the connection request is from the web browser rendering a web page, and
the web page comprises an instruction to fetch a resource from the remote host server.

30. The non-transitory computer-readable medium of claim 29, wherein:
the web page is stored on a web server located on a host server side of the network, and
the remote host server is different than the web server.

31. The method of claim 6, wherein:
the pre-connect response is a connection response from the remote host server to a pre-connect request that mimics the connection request; and
the connection request is generated using cached generation information indicating how the pre-connect request to the remote host server was generated.

32. The apparatus of claim 16, wherein:
the pre-connect response is a connection response from the remote host server to a pre-connect request that mimics the connection request; and
the connection request is generated using cached generation information indicating how the pre-connect request to the remote host server was generated.

33. The non-transitory computer-readable medium of claim 26, wherein:
the pre-connect response is a connection response from the remote host server to a pre-connect request that mimics the connection request; and
the connection request is generated using cached generation information indicating how the pre-connect request to the remote host server was generated.

* * * * *